United States Patent [19]
Takeshita et al.

[11] Patent Number: 6,061,156
[45] Date of Patent: May 9, 2000

[54] OPTICAL TRANSMISSION SYSTEM

[75] Inventors: Hitoshi Takeshita; Naoya Henmi, both of Tokyo, Japan

[73] Assignee: NEC Corporation, Tokyo, Japan

[21] Appl. No.: 09/016,306

[22] Filed: Jan. 30, 1998

[30] Foreign Application Priority Data

Jan. 31, 1997 [JP] Japan ................................ 9-019282

[51] Int. Cl.[7] .............. H04J 14/00; H04J 4/00; H04J 14/02; H04J 14/08
[52] U.S. Cl. .......................... 359/117; 359/123; 359/128; 359/139
[58] Field of Search .................... 359/117, 123, 359/128, 139

[56] References Cited

U.S. PATENT DOCUMENTS

| | | | |
|---|---|---|---|
| 5,463,486 | 10/1995 | Stevens | 359/117 |
| 5,623,356 | 4/1997 | Kaminow et al. | 359/123 |
| 5,959,748 | 9/1999 | Jahreis | 359/117 |

FOREIGN PATENT DOCUMENTS

| | | |
|---|---|---|
| 63-70202 | 3/1988 | Japan . |
| 3-16750 | 2/1991 | Japan . |
| 3-289823 | 12/1991 | Japan . |
| 7-7759 | 1/1995 | Japan . |
| 7-79466 | 3/1995 | Japan . |

*Primary Examiner*—Jason Chan
*Assistant Examiner*—Dalzid Singh
*Attorney, Agent, or Firm*—Sughrue, Mion, Zinn, Macpeak & Seas, PLLC

[57] ABSTRACT

In an optical transmission system comprising an optical branch unit, first through fourth OR/OS pairs each of which includes optical receiver and optical transmitter, optical switch devices for active and standby systems, each of the optical switch devices having an N number of input ports and M number of output ports; and an optical multiplexer for multiplexing an M number of optical signal supplied from the third OR/OS pair and an M number of optical signals supplied from the fourth OR/OS pair to produce an M number of optical signals, the optical switch devices and the first through the fourth OR/OS pairs have a 3-dB margin with respect to the input optical strength. First and second paths are each adjusted such that the time required for transmitting an optical signal is identical for all paths. The first path is from an output port of the optical branch unit to the point where the optical signals are multiplexed in the optical multiplexer via the first and the third OR/OS pairs, and the optical switch device for the active system. The second path is from an output port of the optical branch unit to the point where the optical signals are multiplexed in the optical multiplexer via the second and the fourth OR/OS pairs, and the optical switch device for the standby system.

12 Claims, 4 Drawing Sheets

OPTICAL TRANSMISSION SYSTEM

BACKGROUND OF THE INVENTION

The present invention relates to an optical transmission system and, more particularly, it relates to an improved optical transmission system that allows quick switching of traffic from its active optical switch device to a standby optical switch device in an uninterruptive manner, in fields of optical communication, optical exchangers, and optical networks.

It is important, in providing satisfactory communication service, to keep high reliability of link connection between nodes or between end users in an optical network in the fields of optical communication, optical exchangers, and optical networks that transmit information of a large capacity. Possible link connection faults would include, for example, those to be developed in an optical path and an optical transmission system.

Typical optical transmission systems have two kinds of transmission systems, i.e., an active system (0 system) and a standby system (1 system) in order to improve reliability of the link connection. The active system is switched to the standby system that is in a "hot standby" or "cold standby" state when the active system has a fault. The time required for the switching from the active system to the standby system is not equal to zero. Thus, the service should be interrupted during such switching from the active system to the standby system. Switching from the active system to the standby system without any interruption may be achieved only with an uninterruptive switching. For example, Japanese Patent Laid-Open No. 63-70202 discloses a method for switching an active system to a standby system in an uninterruptive manner in case of a fault in an optical transmission path. This method uses an optical waveguide.

For a fault occurred in optical transmission systems, there are following examples. Japanese Patent Laid-Open No. 8-84116 discloses a technique to provide correct switching by means of distinguishing a fault in an optical transmission path and that in an optical transmission system. Japanese Patent Laid-Open No. 5-316043 discloses a technique to relieve double faults, if any, in an optical transmission system. However, the above-mentioned two techniques requires a non-zero time for switching the active system to the standby system with a certain down time of the system.

A transmission rate for optical signals in recent optical communication has been increased to a Giga bit/s order. In addition, a wavelength multiplexing technique contributes to further increase of a volume of information that is multiplexed and transmitted per unit time via a single optical fiber. Thus, a relative information transmission loss due to the downtime has been increased. Such a circumstance results in an increased demand toward a technique that allows quick switching from the active system to the standby system in uninterruptive manner.

Optical switch devices such as optical cross-connect devices, which are a kind of optical transmission systems, can switch optical paths by means of changing a linkage between optical fibers. The optical switch device of this type has a superior property that can transmit a fast, large-volume signal of the Giga bit/s order. Therefore, it is anticipated considerably that such optical switch devices become commonly available in practice. The optical switch device itself is required to have a high reliability when installed into an optical network. More specifically, it is necessary to ensure that the communication service continues without any deterioration of quality even when the optical switch device has a fault.

SUMMARY OF THE INVENTION

Therefore, an object of the present invention is to provide an optical transmission system that allows quick switching from an active system to a standby system in an uninterruptive manner, in fields of optical communication, optical exchangers, and optical networks.

An optical transmission system according to the present invention comprises an optical branch unit for branching an N number of optical input signals to produce an N number of branched optical signals for an active system and an N number of branched optical signals for a standby system; a first OR/OS pair including a first optical receiver and a first optical transmitter, the first optical receiver being adapted to perform, in response to reception of the branched optical signals for the active system, optical-to-electric conversion of the optical signals to produce electric signals, and the first optical transmitter being adapted to perform electric-to-optical conversion of the electric signals supplied from the first optical receiver to produce optical signals; a second OR/OS pair including a second optical receiver and a second optical transmitter, the second optical receiver being adapted to perform, in response to reception of the branched optical signals for the standby system, optical-to-electric conversion of the optical signals to produce electric signals, and the second optical transmitter being adapted to perform electric-to-optical conversion of the electric signals supplied from the second optical receiver to produce optical signals; an optical switch device for the active system connected to the first OR/OS pair and having an N number of input ports and an M number of output ports; an optical switch device for the standby system connected to the second OR/OS pair and having an N number of input ports and an M number of output ports; a third OR/OS pair including a third optical receiver and a third optical transmitter, the third optical receiver being connected to the M number of output ports of the optical switch device for the active system and adapted to perform optical-to-electric conversion of the optical signals to produce electric signals, and the third optical transmitter being adapted to perform electric-to-optical conversion of the electric signals supplied from the third optical receiver to produce optical signals; a fourth OR/OS pair including a fourth optical receiver and a fourth optical transmitter, the fourth optical receiver being connected to the M number of output ports of the optical switch device for the standby system and adapted to perform optical-to-electric conversion of the optical signals to produce electric signals, and the fourth optical transmitter being adapted to perform electric-to-optical conversion of the electric signals supplied from the fourth optical receiver to produce optical signals; and an optical multiplexer for multiplexing an M number of optical signals supplied from the third OR/OS pair and an M number of optical signals supplied from the fourth OR/OS pair to produce an M number of optical signals.

According to an aspect of the present invention, the optical switch devices for the active and the standby systems and the first through the fourth OR/OS pairs are each capable of operating with a received optical signal having optical strength that is lower than the acceptable maximum input optical strength and is higher than the acceptable minimum input optical strength when both of the optical switch devices for the active and the standby systems are in operation. A first path and a second path are each adjusted such that the time required for transmitting an optical signal is identical for all paths. The first path is from an output port of the optical branch unit to the point where the optical signals are multiplexed in the optical multiplexer via the first OR/OS pair, the optical switch device for the active system, and the third OR/OS pair. The second path is from an output port of the optical branch unit to the point where the optical signals are multiplexed in the optical multiplexer via the second OR/OS pair, the optical switch device for the standby system, and the fourth OR/OS pair. The optical signals supplied from the third OR/OS pair and the optical signals supplied from the fourth OR/OS pair are within a range where interference between them is negligible.

DESCRIPTION OF THE PREFERRED EMBODIMENTS

Figure 1:
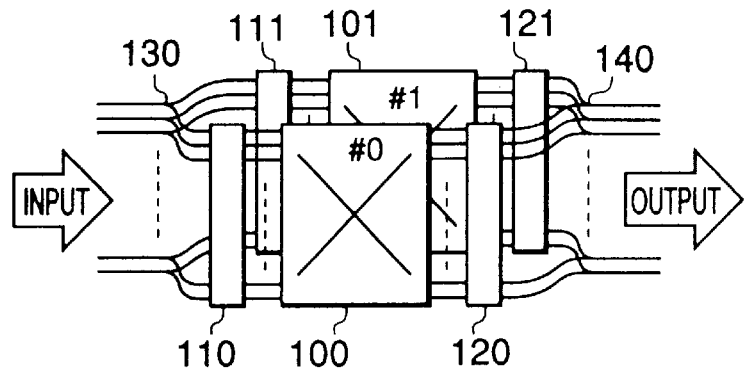
FIG. 1 is a view showing a configuration of an optical transmission system according to a first embodiment of the present invention.
Figure 2:
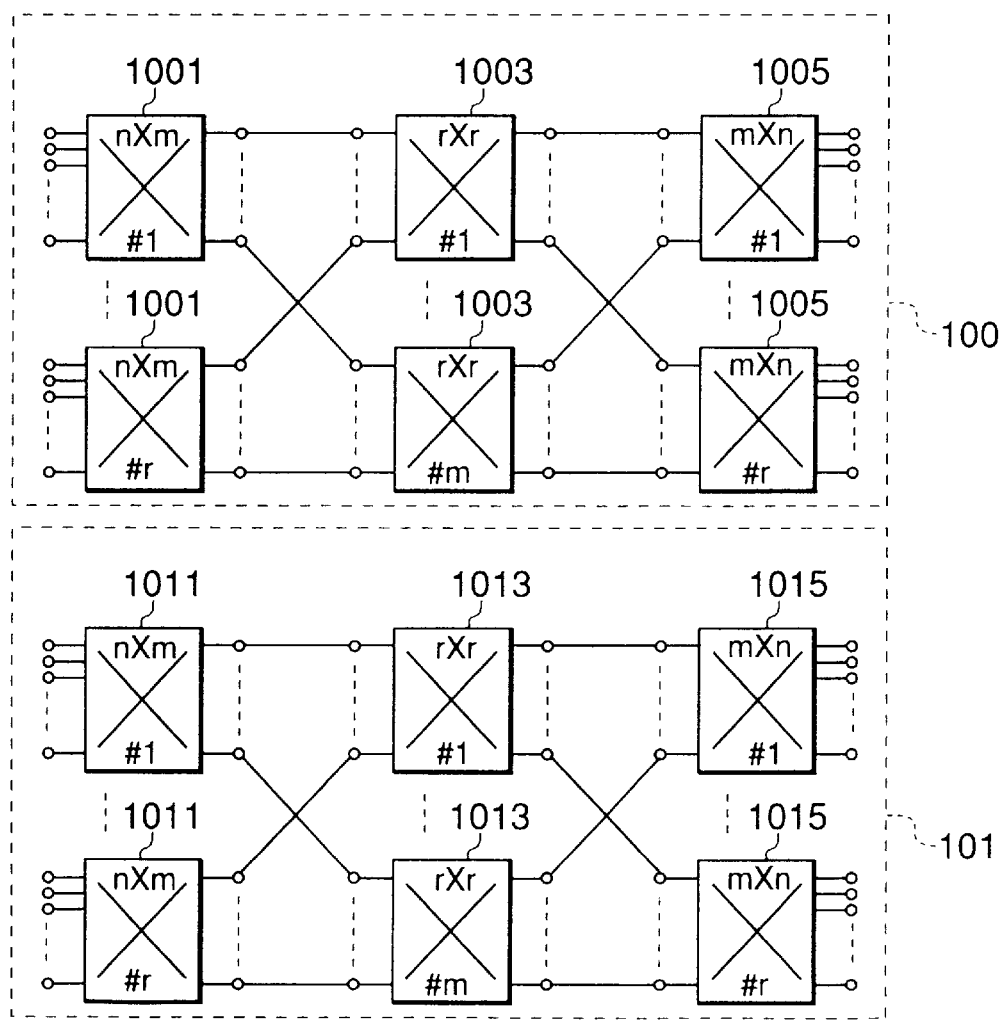
FIG. 2 is a view showing a configuration of an optical switch device in FIG. 1.

Referring to FIGS. 1 and 2, an optical transmission system according to a first embodiment of the present invention is described. In FIG. 1, the optical transmission system comprises two pairs of N by M optical switch devices (hereinafter, referred to as an optical switch device) 100 and 101. Each of the optical switch devices has an N number of input ports and an M number of output ports, wherein N and M each represents a natural number. The optical switch device 100 is used for an active system (0 system) and the optical switch device 101 is used for a standby system (1 system) in this embodiment. As shown in FIG. 2, the optical switch device 100 consists of an r number of optical switch units 1001, an m number of optical switch units 1003, and an r number of optical switch units 1005. The optical switch unit 1001 is an n by m optical switch unit having an n number of input ports and an m number of output ports. The optical switch unit 1003 is an r by r optical switch unit having an r number of input ports and an r number of output ports. The optical switch unit 1005 is an m by n optical switch unit having an m number of input ports and an n number of output ports. In this embodiment, r, n, and m each represents a natural number and n multiplexed by r equals to N, which is also equals to M.

Likewise, the optical switch device 101 consists of an r number of n by m optical switch unit 1011, an m number of r by r optical switch units 1013, and an r number of m by n optical switch units 1015.

The optical switch devices 100 and 101 can operate in response to an optical signal with a received optical signal having an optical strength that is lower by at least 3 dB than the acceptable maximum input optical strength and is higher by 3 dB than the acceptable minimum input optical strength when both of them are in operation normally. Therefore, the optical switch device 101 is operable without any degradation of transmission characteristics of the optical signal when the optical switch device 100 is disconnected while in operation.

The N number of input ports of the optical switch device 100 are connected to an OR/OS pair 110 that is a pair of an optical receiver (hereinafter, abbreviated as OR) and an optical transmitter (hereinafter, abbreviated as OS). The M number of output ports of the optical switch device 100 are connected to an OR/OS pair 120. Likewise, the N number of input ports of the optical switch device 101 are connected to an OR/OS pair 111, while the M number of output ports of the optical switch device 101 are connected to an OR/OS pair 121. The input side of the OR/OS pair 110 and the input side of the OR/OS pair 111 are connected to an optical branch unit or an optical coupler 130 of 2:1. The optical branch unit 130 has a branching ratio of 1:1 to branch each of the N number of optical input signals from an optical transmission path. On the other hand, the output side of the OR/OS pair 120 and the output side of the OR/OS pair 121 are connected to an optical multiplexer 140 of 2:1. The optical multiplexer or an optical coupler 140 has a multiplexing ratio of 1:1 to multiplex the M number of optical signals from the optical switch device 100 with the M number of optical signals from the optical switch device 101.

The OR/OS pairs 120 and 121 can operate in response to an optical signal with a received optical signal having an optical strength that is lower by at least 3 dB than the acceptable maximum input optical strength and is higher by 3 dB than the acceptable minimum input optical strength when both of the optical switch devices 100 and 101 are in operation normally. Therefore, the optical switch device 101 and the OR/OS pair 121 are operable without any degradation of transmission characteristics of the optical signal when the optical switch device 100 is disconnected while in operation.

The optical switch devices 100 and 101 and the OR/OS pairs 110, 111, 120, and 121 are continuously operated. The length of the optical path from the input port of the optical branch unit 130 to the output port of the optical multiplexer 140 via the OR/OS pair 110, the optical switch device 100, and the OR/OS pair 120 is adjusted to be equal to the length of the optical path from the input port of the optical branch unit 130 to the output port of the optical multiplexer 140 via the OR/OS pair 111, the optical switch device 101, and the OR/OS pair 121. As a result, the optical signal branched by the optical branch unit 130, passed through the optical switch device 100 for the active system, and multiplexed by the optical multiplexer 140 is in synchronism in time with the optical signal branched by the optical branch unit 130, passed through the optical switch device 101 for the standby system, and multiplexed by the optical multiplexer 140.

Next, operation of the optical transmission system according to the first embodiment is described. First, it is described for the case where the optical switch device 100 is used for the active system and the optical switch device 101 is used for the standby system. Only one of the N number of optical signals is described below for the purpose of simplifying the description.

The optical signal on the optical transmission path is supplied to the optical branch unit 130 where average optical strength is divided into two. Branched optical signals are supplied to the OR/OS pair 110 for the active system and the OR/OS pair 111 fox the standby system, respectively. The OR/OS pairs 110 and 111 each converts the optical signal into an electric signal by means of an optical-to-electric conversion. Subsequently, the OR/OS pair converts the electric signal into an optical signal by means of an electric-to-optical conversion. The optical signal after the conversion is then produced as a converted optical signal. The OR/OS pairs 110 and 111 also perform waveform reshape and waveform regeneration of the converted optical signal and produce the reshaped and regenerated optical signal. The reshaped and regenerated optical signal is supplied to the optical switch devices 100 and 101. The optical switch devices 100 and 101 switch the optical paths, if necessary. The reshaped and regenerated optical signal is supplied to the OR/OS pairs 120 and 121 via the paths on the optical switch devices 100 and 101. A switching pattern for the optical switch device 100 is exactly identical to that for the optical switch device 101. In the OR/OS pairs 120 and 121, the optical signal is subjected to the optical-to-electric conversion, the electric-to-optical conversion, the waveform reshape, and the waveform regeneration, as in the OR/OS pairs 110 and 111. The optical signals from the OR/OS pairs 120 and 121 are multiplexed by the optical multiplexer 140. Multiplexed optical signal is supplied to the optical transmission path again. In practice, the optical multiplexer 140 delivers an M number of multiplexed optical signals to the optical transmission path as output optical signals.

As described above, the length of the optical paths from the optical branch unit 130 to the optical multiplexer 140 for the active and the standby systems are adjusted to be equal to each other. Therefore, the optical signal branched by the optical branch unit 130 and passed through the active system is multiplexed by the optical multiplexer 140 with the optical signal branched by the optical branch unit 130 and passed through the standby system in a time synchronous manner.

The optical signal may be wavelength converted at the OR/OS pairs 110, 111, 120, and 121, if necessary. The OR/OS pairs 110, 111, 120, and 121 no carry out clock synchronization, so that they can deal with optical signals received at any transmission rate. More specifically, optical signals may be supplied to the optical switch devices 100 and 101 simultaneously at the transmission rate of 10 Giga bit/s and 2.5 Giga bit/s, respectively, for the subsequent switching of the paths, and they may be supplied to the optical path again.

As described above, the optical switch devices 100 and 101 can operate in response to the optical signal with the received optical signal having the optical strength that is lower by at least 3 dB than the acceptable maximum input optical strength and is higher by 3 dB than the acceptable minimum input optical strength when both of them are in operation normally. The OR/OS pairs 120 and 121 can operate in response to the optical signal with the received optical signal having the optical strength that is lower by at least 3 dB than the acceptable maximum input optical strength and is higher by 3 dB than the acceptable minimum input optical strength when both of the optical switches 100 and 101 are in operation normally. Therefore, the optical strength of the signals supplied to the optical switch device 101 and to the OR/OS pair 121 are higher by 3 dB when only the optical switch device 101 is operated and the optical switch device 100 is disconnected while in operation, than those obtained with the optical switch device 100 connected. However, the optical switch device 101 and the OR/OS pair 121 has a margin of at least 3 dB relative to the optical strength of the incident light, so that the optical signal can be transmitted on the transmission path without any degradation. For the two optical signals to be multiplexed by the optical multiplexer 140, any effect of interference between two wavelengths is negligible during the multiplexing operation. Thus, the optical signal passes through the optical transmission system of this invention without any deterioration of the quality even when the optical switch device 100 is disconnected while the optical transmission system is in service. This means that optical live insertion is available.

Next, an example is described where the optical switch devices 100 and 101 are used entirely as a completely non blocking single optical switch.

Operation of the optical branch unit 130, the OR/OS pairs 110, 111, 120, and 121, and the optical multiplexer 140 is similar to that in the case where the above-mentioned optical switch devices 100 and 101 are used for the active and the standby systems, respectively. It is also similar that the optical signal branched by the optical branch unit 130 and passed through the active system is multiplexed by the optical multiplexer 140 with the optical signal branched by the optical branch unit 130 and passed through the standby system in a time synchronous manner.

Assuming that the optical switch devices 100 and 101 as a single optical switch device, completely non blocking switching can be made even if the optical switch units 1001, 1003, 1005, 1011, 1013, and 1015 are not completely non blocked type. More specifically, the following example is a case where only the optical switch device 100 is used. It is assumed that an input port P-1 of the optical switch device 100 is connected to an output P-N thereof. It may be impossible, depending on the case, to connect the input port P-1 to the output port P-N without reconfiguring the linkage after some of the link active connections in the optical switch device 100 are disconnected. In this event, since the same optical signal passes through the optical switch device 101 that passes through the optical switch device 100, the switching pattern in the optical switch device 101 is determined to be different from that in the optical switch device 100. As a result, the optical signal becomes available that passes through the optical switch device 101 only for the link connections where the completely non blocking operation cannot be achieved in the optical switch device 100. Accordingly, desired switching can be achieved without disconnecting an active link connection.

The optical transmitters in the third and the fourth OR/OS pairs 120 and 121 are so designed as to disconnect output of the optical signal when the optical strength of the optical input to the optical receiver in the first and the second OR/OS pairs 110 and 111 becomes equal to or lower than a predetermined threshold value. This is similar to second and third embodiments described later.

Figure 3:
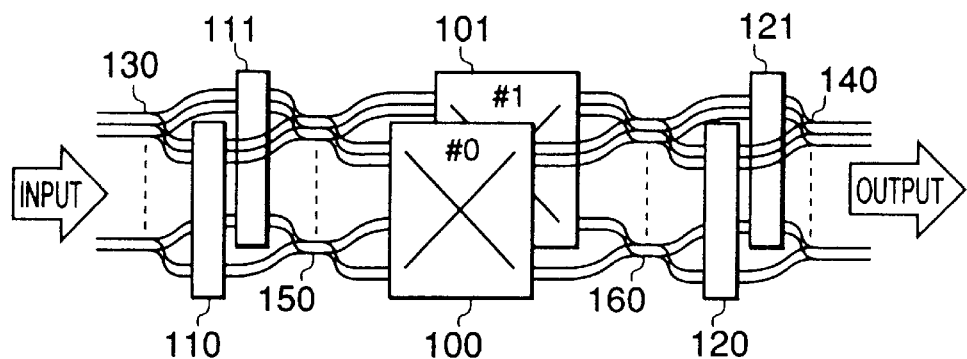
FIG. 3 is a view showing a configuration of an optical transmission system according to a second embodiment of the present invention.

Referring to FIG. 3, an optical transmission system according to a second embodiment of the present invention is described. The optical transmission system of this embodiment is similar to the one shown in FIG. 1 except that an optical coupler 150 is connected between the OR/OS pairs 110 and 111 and the optical switch device 100 and 101, respectively, and that an optical coupler 160 is connected between the optical switch devices 100 and 101 and the OR/OS pairs 120 and 121, respectively.

The optical coupler 150 is connected between the input side of the optical switch device 100 and the output side of the OR/OS pair 110. The optical coupler 160 is connected between the output side of the optical switch device 100 and the input side of the OR/OS pair 120. The optical coupler 150 is a two-input and two-output type and has a branching ratio of 1:1. The optical coupler 160 also is a two-input and two-output type. Likewise, the optical coupler 150 is connected between the input side of the optical switch device 101 and the output side of the OR/OS pair 111. The optical coupler 160 is connected between the output side of the optical switch device 101 and the input side of the OR/OS pair 121. The optical couplers 150 and 160 in this embodiment may be referred to as first and second optical couplers, respectively.

The optical switch devices 100 and 101 and the OR/OS pairs 110, 111, 120, and 121 are continuously operated. The length of the optical path from the branching point of the optical branch unit 130 to the multiplexing point of the optical coupler 150 via the OR/OS pair 110 is adjusted to be equal to the length of the optical path from the branching point of the optical branch unit 130 to the multiplexing point of the optical coupler 150 via the OR/OS pair 111. In addition, the length of the optical path from the multiplexing point of the optical coupler 150 to the multiplexing point of the optical coupler 160 via the optical switch device 100 is adjusted to be equal to the length of the optical path from the multiplexing point of the optical multiplexer 150 to the multiplexing point of the optical coupler 160 via the optical switch device 101. Furthermore, the length of the optical path from the multiplexing point of the optical coupler 160 to the multiplexing point of the optical multiplexer 140 via the OR/OS pair 120 is adjusted to be equal to the length of the optical path from the multiplexing point of the optical coupler 160 to the multiplexing point of the optical multiplexer 140 via the OR/OS pair 120. Therefore, the optical signal branched by the optical branch unit 130 and passed through the optical switch device 100 for the active system to the optical multiplexer 140 is in synchronism in time with the optical signal branched by the optical branch unit 130 and passed through the optical switch device 101 for the standby system to the optical multiplexer 140.

Next, operation of the optical transmission system according to the second embodiment is described in conjunction with the case where the optical switch device 100 is used for the active system and the optical switch device 101 is used for the standby system. As in the first embodiment, only one of the N number of optical signals is described.

The optical signal on the optical transmission path is supplied to the optical branch unit 130 where average optical strength is divided into two. The branched optical signals are supplied to the OR/OS pair 110 for the active system and the OR/OS pair 111 for the standby system, respectively. As described above, the OR/OS pairs 110 and 111 each converts the optical signal into an electric signal by means of an optical-to-electric conversion. Subsequently, the OR/OS pair converts the electric signal into an optical signal by means of an electric-to-optical conversion. The OR/OS pairs 110 and 111 also perform waveform reshape and waveform regeneration of the converted optical signal and produce the reshaped and regenerated optical signal. The reshaped and regenerated optical signal is supplied to the optical coupler 150. The optical coupler 150 multiplexes and reshapes the two reshaped and regenerated optical signals and branches again into two optical signals to produce them into the optical switch devices 100 and 101, respectively.

In this event, as described above, the length of the optical path from the input port of the optical branch unit 130 to the output port of the optical coupler 150 via the OR/OS pair 110 is adjusted to be equal to the length of the optical path from the input port of the optical branch unit 130 to the output port of the optical coupler 150 via the OR/OS pair 111. Therefore, the two optical signals to be multiplexed by the optical coupler 150 are in synchronism in time with each other. The optical signals produced by the optical coupler 150 are supplied to the optical switch devices 100 and 101, respectively. The optical switch devices 100 and 101 switch the optical paths, if necessary. The switching pattern for the optical switch device 100 is exactly identical to that for the optical switch device 101.

The optical signals passed through the optical switch devices 100 and 101 are multiplexed by the optical coupler 160. The length of the optical path from the input port of the optical switch device 100 to the output port of the optical coupler 160 is adjusted to be equal to the length of the optical path from the input port of the optical switch device 101 to the output port of the optical coupler 160. Therefore, the optical signals multiplexed by the optical coupler 160 are in synchronism in time with each other. The optical signal branched again into two signals by the optical coupler 160 are supplied to the OR/OS pairs 120 and 121, respectively. In the OR/OS pairs 120 and 121, the optical signal is subjected to the optical-to-electric conversion, the electric-to-optical conversion, the waveform reshape, and the waveform regeneration. The optical signals from the OR/OS pairs 120 and 121 are multiplexed by the optical multiplexer 140. The multiplexed optical signal is supplied to the optical transmission path again. As described above, the length of the optical path from the input port of the optical coupler 160 to the output port of the optical multiplexer 140 via the OR/OS pair 120 is adjusted to be equal to the length of the optical path from the input port of the optical coupler 160 to the output port of the optical multiplexer 140 via the OR/OS pair 121. Therefore, the optical signals to be multiplexed by the optical multiplexer 140 are supplied to the optical transmission path in a time synchronous manner.

The optical signal may be wavelength converted at the OR/OS pairs 110, 111, 120, and 121, if necessary. The OR/OS pairs 110, 111, 120, and 121 no carry out pulse synchronization, so that they can deal with optical signals received at any transmission rate. More specifically, optical signals may be supplied to the optical switch devices 100 and 101 simultaneously at the transmission rate of 10 Giga bit/s and 2.5 Giga bit/s, respectively, for the subsequent switching of the paths, and they may be supplied to the optical path again. Aiming at the operational status of the OR/OS pairs 110, 111, 120, and 121 as well as the optical switch devices 100 and 101. It is assumed that only the OR/OS pair 110 is disconnected while in operation. In this case, the OR/OS pairs 110 and 111 are connected to the optical switch devices 100 and 101, respectively, through the optical coupler 150. Therefore, the optical switch devices 100 and 101 are both capable of operating correctly. At that time, it is assumed that the OR/OS pair 121 is disconnected while in operation. At that time, the OR/OS pairs 111 and 120 and the optical switch devices 100 and 101 are operable correctly because the optical switch devices 100 and 101 are connected to the OR/OS pairs 120 and 121, respectively, through the optical coupler 160. Therefore, the optical signal is supplied to the optical transmission path via the optical transmission system without any deterioration of the quality. More 'specifically, it is enough that at least one of the OR/OS pairs 110 and 111, and at least one of the OR/OS pairs 120 and 121 are operated correctly because of the optical couplers 150 and 160 in the optical transmission system of the second embodiment. This means that reliability against a fault can be improved.

As described above, the optical switch devices 100 and 101 can operate in response to an optical signal with a received optical signal having optical strength that is lower by at least 3 dB than the acceptable maximum input optical strength and is higher by 3 dB than the acceptable minimum input optical strength when both of them are in operation normally. The OR/OS pairs 120 and 121 can operate in response to an optical signal with a received optical signal having optical strength that is lower by at least 3 dB than the acceptable maximum input optical strength and is higher by 3 dB than the acceptable minimum input optical strength when both of the optical switch devices 100 and 101 are in operation normally. For example, it is assumed that only the optical switch device 101 is operated with the optical switch device 100 being disconnected while in operation. The optical strength of the optical signals supplied to the optical switch device 101 and to the OR/OS pairs 121 are higher by 3 dB than those obtained with the optical switch device 100 connected. However, the optical switch device 101 and the OR/OS pair 121 has a margin of at least 3 dB relative to the optical strength of the incident light, so that any effect of interference between two wavelengths is negligible during the multiplexing operation for the two optical signals to be multiplexed by the optical multiplexer 140. Thus, the optical signal passes through the optical transmission system of this invention without any deterioration of the quality even when the optical switch device 100 is disconnected while the optical transmission system is in service.

Next, an example is described where the optical switch devices 100 and 101 are used entirely as a completely non blocking single optical switch device. Operation of the optical branch unit 130, the OR/OS pairs 110, 111, 120, and 121, the optical multiplexer 140, and the optical couplers 150 and 160 is similar to that in the case where the above-mentioned optical switch devices 100 and 101 are used for the active and the standby systems, respectively. It is also similar that the optical signal branched by the optical branch unit 130 and passed through the active system is multiplexed by the optical multiplexer 140 with the optical signal branched by the optical branch unit 130 and passed through the standby system in a time synchronous manner.

Assuming that the optical switch devices 100 and 101 as a single optical switch device, completely non blocking switching can be made even if the optical switch units 1001, 1003, 1005, 1011, 1013, and 1015 (FIG. 2) are not completely non blocked type. More specifically, the following example is a case where only the optical switch device 100 is used. It is assumed that the input port P-1 of the optical switch device 100 is connected to the output P-N thereof. It may be impossible, depending on the case, to connect the input port P-1 to the output port P-N without reconfiguring the linkage after some of the link active connections in the optical switch device 100 are disconnected. In this event, since the same optical signal passes through the optical switch device 101 that passes through the optical switch device 100, the switching pattern in the optical switch device 101 is determined to be different from that in the optical switch device 100. As a result, the optical signal becomes available that passes through the optical switch device 101 only for the link connections where the completely non blocking operation cannot be achieved in the optical switch device 100. Accordingly, desired switching can be achieved without disconnecting an active link connection.

Figure 4:
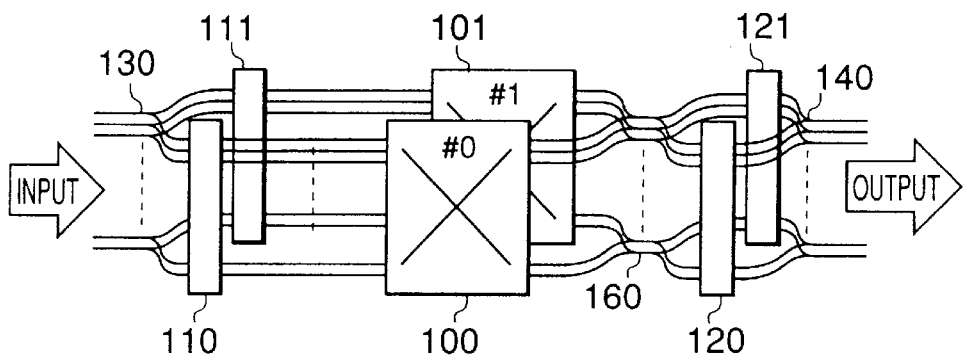
FIG. 4 is a view showing a configuration of an optical transmission system according to a third embodiment of the present invention.

Referring to FIG. 4, a third embodiment of the present invention is described. The optical transmission system of the third embodiment is similar to the one shown in FIG. 1 except that the optical coupler 160 is connected between the optical switch devices 100 and 101 and the OR/OS pairs 120 and 121, respectively.

More specifically, the input side of the optical switch device 100 is connected to the OR/OS pair 110. The optical coupler 160 is a two-inputs and two-outputs type and is connected between the output side of the optical switch device 100 and the OR/OS pair 120. Likewise, the input side of the optical switch device 101 is connected to the OR/OS pair 111. The optical coupler 160 is connected between the output side of the optical switch device 101 and the OR/OS pair 121.

As described above, the OR/OS pairs 120 and 121 can operate in response to an optical signal with a received optical signal having optical strength that is lower by at least 3 dB than the acceptable maximum input optical strength and is higher by 3 dB than the acceptable minimum input optical strength when both of the optical switches 100 and 101 are in operation abnormally. For the two optical signals to be multiplexed by the optical coupler 160 and the optical multiplexer 140, any effect of interference between two wavelengths is negligible during the multiplexing operation, with the wavelengths of the optical signals supplied from the OR/OS pairs 110 and 111 being set at a 1.5 μm band and 1.3 μm band. Therefore, the optical switch device 101 and the OR/OS pair 121 are operable without any degradation of transmission characteristics of the optical signal when the optical switch device 100 is disconnected while in operation.

The optical switch devices 100 and 101 and the OR/OS pairs 110, 111, 120, and 121 are continuously operated. The length of the optical path from the input port of the optical branch unit 130 to the output port of the optical multiplexer 140 via the OR/OS pair 110, the optical switch device 100, the optical coupler 160, and the OR/OS pair 120 is adjusted to be equal to the length of the optical path from the input port of the optical branch unit 130 to the output port of the optical multiplexer 140 via the OR/OS pair 111, the optical switch device 101, the optical coupler 160, and the OR/OS pair 121. Therefore, two optical signals are synchronized in time with each other that are branched into two signals by the optical branch unit 130, passed through the optical switch devices 100 and 101, and multiplexed by the optical multiplexer 140.

Next, operation of the optical transmission system according to the third embodiment is described. In this embodiment, the optical switch device 100 is used for the active system and the optical switch device 101 is used for the standby system. As in the aforementioned embodiments, only one of the N number of optical signals is described.

The optical signal on the optical transmission path is supplied to the optical branch unit 130 where average optical strength is divided into two. The branched optical signals are supplied to the OR/OS pair 110 for the active system and the OR/OS pair 111 for the standby system, respectively. As described above, the OR/OS pairs 110 and 111 each converts the optical signal into an electric signal by means of the optical-to-electric conversion. Subsequently, the OR/OS pair converts the electric signal into an optical signal by means of the electric-to-optical conversion. The OR/OS pairs 110 and 111 also perform waveform reshape and waveform regeneration of the converted optical signal. The reshaped and regenerated optical signals are supplied to the optical switch devices 100 and 101. The optical switch devices 100 and 101 switch the optical paths, if necessary. The reshaped and regenerated optical signal is supplied to the optical coupler 160 via the paths on the optical switch devices 100 and 101. The optical signals from the optical switch devices 100 and 101 are multiplexed by the optical coupler 160. The switching pattern for the optical switch device 100 is exactly identical to that for the optical switch device 101.

The length of the optical path from the input port of the optical switch device 100 to the output port of the optical coupler 160 is adjusted to be equal to the length of the optical path from the input port of the optical switch device 101 to the output port of the optical coupler 160. Therefore, the optical signals multiplexed by the optical coupler 160 are in synchronism in time with each other. The optical signal branched again into two signals by the optical coupler 160 are supplied to the OR/OS pairs 120 and 121, respectively. In the OR/OS pairs 120 and 121, the optical signal is subjected to the optical-to-electric conversion, the electric-to-optical conversion, the waveform reshape, and the waveform regeneration, as in the OR/OS pairs 110 and 111. The OR/OS pairs 120 and 121 produce the reshaped and regenerated optical signals. Subsequently, the reshaped and regenerated optical signals from the OR/OS pairs 120 and 121 are multiplexed by the optical multiplexer 140. The multiplexed optical signal is supplied to the optical transmission path again. As described above, the length of the optical path from the input port of the optical coupler 160 to the output port of the optical multiplexer 140 via the OR/OS pair 120 is adjusted to be equal to the length of the optical path from the input port of the optical coupler 160 to the output port of the optical multiplexer 140 via the OR/OS pair 121. Therefore, the optical signals to be multiplexed by the optical multiplexer 140 are supplied to the optical transmission path in a time synchronous manner.

The optical signal may be wavelength converted at the OR/OS pairs 110, 111, 120, and 121, if necessary. Accordingly, the optical signals at the 1.5 μm band and at the 1.3 μm band may be transmitted into the optical switch devices 100 and 101, respectively, on a single path. The OR/OS pairs 110, 111, 120, and 121 no carry out pulse synchronization, so that they can deal with optical signals received at any transmission rate. More specifically, optical signals may be supplied to the optical switch devices 100 and 101 simultaneously at the transmission rate of 10 Giga bit/s and 2.5 Giga bit/s, respectively, for the subsequent switching of the paths, and they may be supplied to the optical path again.

Aiming at the operational status of the OR/OS pairs 120, and 121 as well as the optical switch devices 100 and 101. It is assumed that only the OR/OS pair 121 is disconnected while in operation. At that time, the optical switches 100 and 101 are connected to the OR/OS pairs 120 and 121, respectively, through the optical coupler 160. Therefore, the OR/OS pairs 110, 111, and 120, and the optical switch devices 100 and 101 are capable of operating correctly. Therefore, the optical signal is supplied to the optical transmission path via the optical transmission system without any deterioration of the quality. More specifically, it is enough that at least one of the OR/OS pairs 120 and 121 is operated correctly because of the optical coupler 160 in the optical transmission system of the third embodiment. This means that reliability against a fault can be improved.

As described above, the optical switch devices 100 and 101 can operate in response to an optical signal with a received optical signal having optical strength that is lower by at least 3 dB than the acceptable maximum input optical strength and is higher by 3 dB than the acceptable minimum input optical strength when both of them are in operation normally. The OR/OS pairs 120 and 121 can operate in response to an optical signal with a received optical signal having optical strength that is lower by at least 3 dB than the acceptable maximum input optical strength and is higher by 3 dB than the acceptable minimum input optical strength when both of the optical switches 100 and 101 are in operation normally. For example, it is assumed that the optical switch device 100 is disconnected while in operation and only the optical switch device 101 is operated. In this event, the optical strength of the signals supplied to the optical switch device 101 and to the OR/OS pair 121 are higher by 3 dB when only the optical switch device 101 is operated and the optical switch device 100 is disconnected while in operation, than those obtained with the optical switch device 100 connected. However, the optical switch device 101 and the OR/OS pair 121 has a margin of at least 3 dB relative to the optical strength of the incident light. For the two optical signals to be multiplexed by the optical coupler 160 and the optical multiplexer 140, therefore, any effect of interference between two wavelengths is negligible during the multiplexing operation. The optical signal can propagate through the optical transmission system of this invention without any deterioration of the quality even when the optical switch device 100 is disconnected while the optical transmission system is in service.

The above-mentioned description applies the case where the optical switch devices 100 and 101 are used entirely as a completely non blocking single optical switch device.

Operation of the optical branch unit 130, the OR/OS pairs 110, 111, 120, and 121, the optical multiplexer 140, and the optical coupler 160 is similar to that in the case where the above-mentioned optical switch devices 100 and 101 are used for the active and the standby systems, respectively. It is also similar that the optical signal branched by the optical branch unit 130 and passed through the active system is multiplexed by the optical multiplexer 140 with the optical signal branched by the optical branch unit 130 and passed through the standby system in a time synchronous manner.

Assuming that the optical switch devices 100 and 101 as a single optical switch device, completely non blocking switching can be made even if the optical switch units 1001, 1003, 1005, 1011, 1013, and 1015 are not completely non blocked type. More specifically, the following example is a case where only the optical switch device 100 is used. It is assumed that the input port P-1 of the optical switch device 100 is connected to the output P-N thereof. It may be impossible, depending on the case, to connect the input port P-1 to the output port P-N without reconfiguring the linkage after some of the link active connections in the optical switch device 100 are disconnected. In this event, since the same optical signal passes through the optical switch device 101 that passes through the optical switch device 100, the switching pattern in the optical switch device 101 is determined to be different from that in the optical switch device 100. This makes the optical signal available that passes through the optical switch device 101 only for the link connections where the completely non blocking operation cannot be achieved in the optical switch device 100. As a result, desired switching can be achieved without disconnecting an active link connection.

Figure 5:
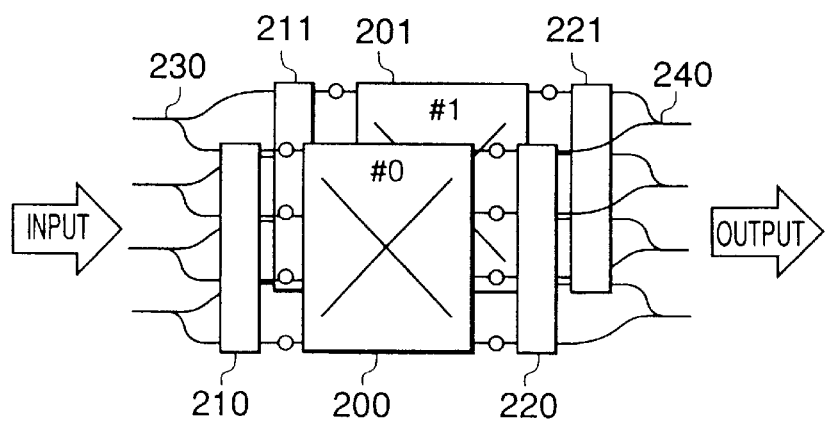
FIG. 5 is a view showing a practical configuration of the optical transmission system in FIG. 1.
Figure 6A:
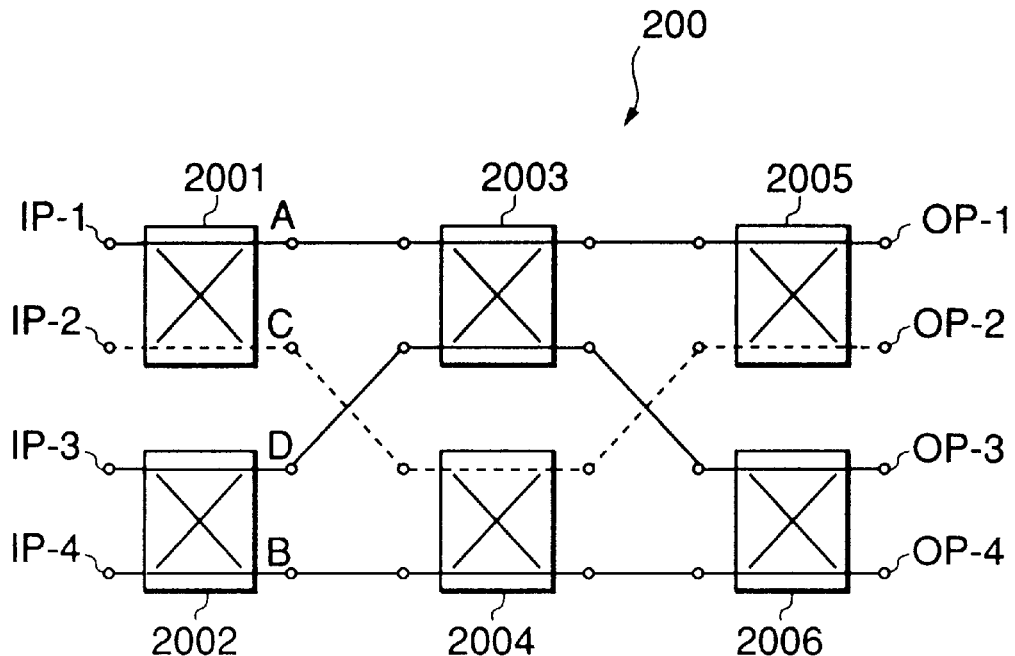
FIGS. 6A and 6B are views showing a practical configuration of a gate switch device in FIG. 5.
Figure 6B:
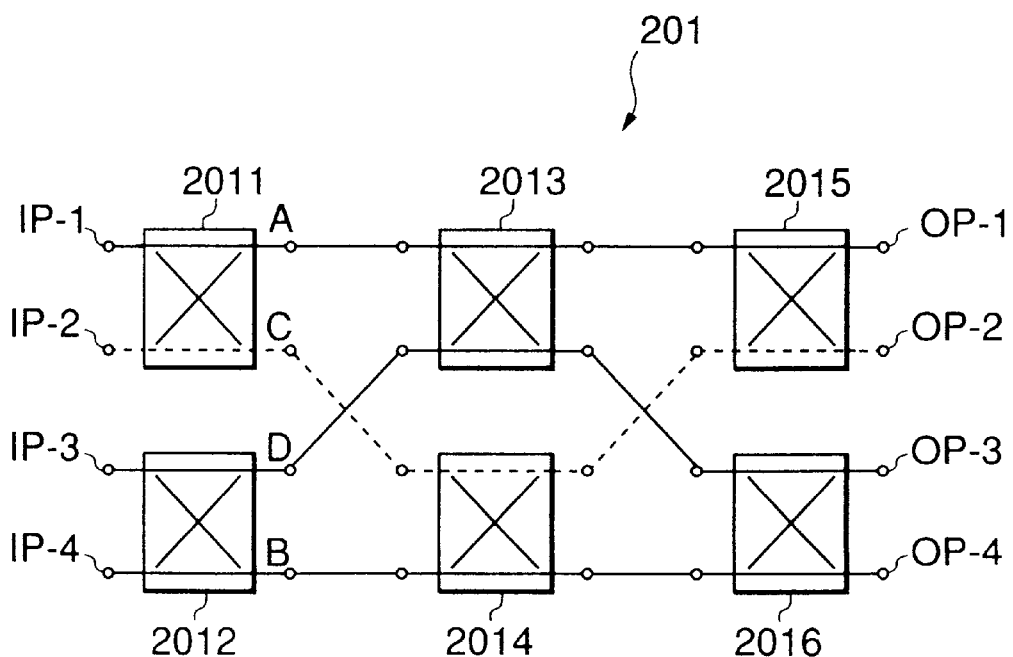

Referring to FIGS. 5, 6A, and 6B, an example of the optical transmission system of the first embodiment is described that is equal to the one described in conjunction with FIG. 1.

In FIG. 5, the optical switch devices 100 and 101 described in FIG. 1 are achieved by gate switch devices 200 and 201, respectively. The gate switch devices 200 and 201 are each a 4-by-4 semiconductor optical amplifier type having four input ports and four output ports. In other words, N=M=4 holds. FIG. 6A shows an internal configuration of the gate switch device 200. The gate switch device 201 has the same configuration as the gate switch device 200. The four input ports of the gate switch device 200 are connected to an OR/OS pair 210. The four output ports of the gate switch device 200 are connected to an OR/OS pair 220. The four input ports of the gate switch device 201 are connected to an OR/OS pair 211 while the four outputs of the gate switch device 201 are connected to an OR/OS pair 221. The optical signa l from the transmission path is branched by an optical branch unit 230. Branched optical signals are supplied to the OR/OS pairs 210 and 211, respectively. The optical signals supplied from the OR/OS pairs 220 and 221 are multiplexed by an optical multiplexer 240 and transmitted to the optical transmission path.

In FIG. 6A, the gate switch device 200 consists of six 2-by-2 semiconductor optical amplifier type gate switch units 2001 through 2006. Each gate switch unit has two input ports and two output ports. The gate switch units 2001, 2003, and 2005 are cascade connected with each other. Likewise, the gate switch units 2002, 2004, and 2006 are cascade connected with each other. The two input ports of the gate switch unit 2001 and the two input ports of the gate switch unit 2002 are corresponding to the four input ports of the gate switch device 200. The two output ports of the gate switch unit 2005 and the two output ports of the gate switch unit 2006 are corresponding to the four output ports of the gate switch device 200.

In FIG. 6B, the gate switch device 201 consists of six 2-by-2 semiconductor optical amplifier type gate switch units 2011 through 2016. Each gate switch unit has two input ports and two output ports. The gate switch units 2011, 2013, and 2015 are cascade connected with each other while the gate switch units 2012, 2014, and 2016 are cascade connected with each other. The two input ports of the gate switch unit 2011 and the two input ports of the gate switch unit 2012 are corresponding to the four input ports of the gate switch device 201. The two output ports of the gate switch unit 2015 and the two output ports of the gate switch unit 2016 are corresponding to the four output ports of the gate switch device 201. The following description is made only for one optical signal.

The optical signal on the optical transmission path is supplied to the optical branch unit 230 where average optical strength is divided into two. The branched optical signals are supplied to the OR/OS pair 210 for the active system and the OR/OS pair 211 for the standby system, respectively. As described above, the OR/OS pairs 210 and 211 each converts the optical signal into an electric signal by means of an optical-to-electric conversion. Subsequently, the OR/OS pair converts the electric signal into an optical signal by means of an electric-to-optical conversion. The OR/OS pairs 210 and 211 also perform waveform reshape and waveform regeneration of the converted optical signal and produce the reshaped and regenerated optical signal. The reshaped and regenerated optical signal is supplied to the gate switch devices 200 and 201. The gate switch devices 200 and 201 switch the optical paths, if necessary. The optical signals passed through the gate switch devices 200 and 201 are then supplied to the OR/OS pairs 220 and 221, respectively. The switching pattern for the gate switch device 200 is exactly identical to that for the gate switch device 201. In the OR/OS pairs 220 and 221, the optical signal is subjected to the optical-to-electric conversion, the electric-to-optical conversion, the waveform reshape, and the waveform regeneration, as in the OR/OS pairs 210 and 211. The optical signals from the OR/OS pairs 220 and 221 are multiplexed by the optical multiplexer 240. The multiplexed optical signal is supplied to the optical transmission path again.

The length of the optical path from the optical branch unit 230 to the optical multiplexer 240 via the gate switch device 200 is equal to the length of the optical path from the optical branch unit 230 to the optical multiplexer 240 via the gate switch device 201. The two optical signals, i.e., the optical signal branched by the optical branch unit 230 and passed through the active system and the optical signal branched by the optical branch unit 230 and passed through the standby system, are multiplexed in a time synchronous manner by the optical multiplexer 240. The multiplexed optical signal is supplied to the optical transmission path.

The optical signal may be wavelength converted at the OR/OS pairs 210, 211, 120, and 221, if necessary. The OR/OS pairs 210, 211, 220, and 221 no carry out pulse synchronization, so that they can deal with optical signals received at any transmission rate. More specifically, optical signals may be supplied to the gate switch devices 200 and 201 simultaneously at the transmission rate of 10 Giga bit/s and 2.5 Giga bit/s, respectively, for the subsequent switching of the paths, and they may be supplied to the optical transmission path again.

Operation of the gate switch devices 200 and 201 is described for the case where the gate switch device 200 is used for the active system and the gate switch device 201 is used for the standby system. The gate switch devices 200 and 201 are operated with a 3-dB margin relative to the input optical strength of the incident light when both of them are operated normally. Likewise, the OR/OS pairs 220 and 221 are operated with a 3-dB margin relative to the input optical strength of the incident light when both of the gate switch devices 200 and 201 are operated normally.

For example, the optical strength of the optical signals supplied to the gate switch device 201 and to the OR/OS pair 221 are higher by 3 dB when only the gate switch device 201 is operated and the gate switch device 200 is disconnected while in operation, than those obtained with the gate switch device 200 connected. However, the gate switch device 201 and the OR/OS pair 221 has a margin of at least 3 dB relative to the input optical strength of the incident light. For the two optical signals to be multiplexed by the optical multiplexer 240, any effect of interference between two wavelengths is negligible during the multiplexing operation. Accordingly, the optical signal can be transmitted on the transmission path without any degradation. Thus, the optical signal passes through the optical transmission system of this invention without any deterioration of the quality even when the gate switch device 200 is disconnected while the optical transmission system is in service. This means that optical live insertion is available.

Next, an example is described where the gate switch devices 200 and 201 are used entirely as a completely non blocking single optical switch device. For example, it is considered that the switching pattern as shown in FIG. 6A is connected to the gate switch device 200. This is for switching the connection such that an input port IP-1 of the gate switch device 200 is connected to an output port OP-4 as a link connection A and an input port IP-4 is connected to an output port OP-1 as a link connection B. In this event, it is necessary to switch at least one of the gate switch units 2001 through 2006 from a bar state to a cross state. This requires disconnection of a link connection C between an input port IP-2 and an output port OP-2 and a link connection D between an input port IP-3 and an output port OP-3. However, the same optical signal passes through the gate switch device 201 that passes through the gate switch device 200. If the switching pattern in the gate switch device 201 is determined to be different from that in the optical switch device 100, it makes possible to provide the above-mentioned operation without changing the gate switch units associated with the link connections C and D. In other words, the combination of the gate switch devices 200 and 201 are operable as a single completely non blocking gate switch device.

Figure 7:
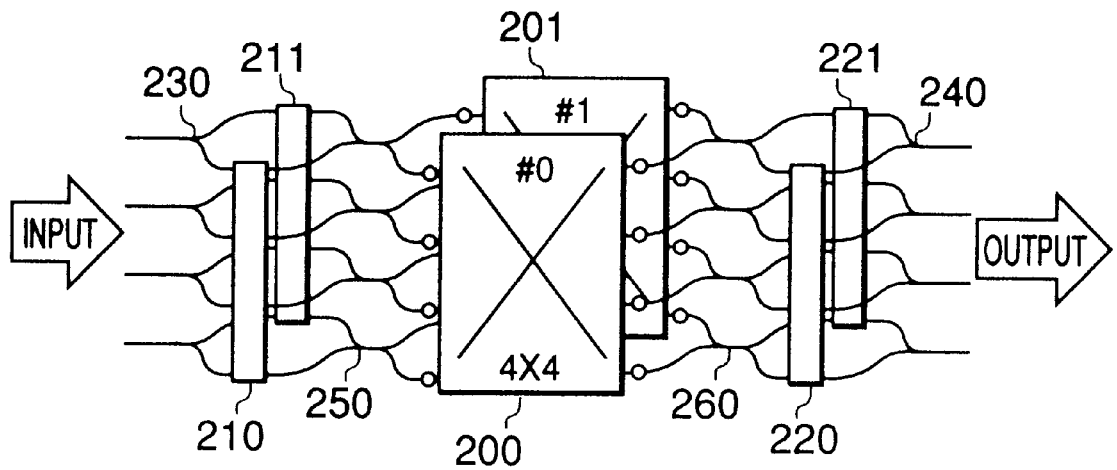
FIG. 7 is a view showing a practical configuration of the optical transmission system in FIG. 3.

Referring to FIG. 7, an example of the optical transmission system of the second embodiment is described that is equal to the one described in conjunction with FIG. 3.

In FIG. 7, the optical transmission system is similar to the one illustrated in FIG. 5 except for optical couplers 250 and 260. More specifically, the optical coupler 250 is connected between the OR/OS pair 210 and the gate switch device 200 and between the OR/OS pair 211 and the gate switch device 201. The optical coupler 260 is connected between the gate switch device 200 and the OR/OS pair 220 and between the gate switch device 201 and the OR/OS pair 221.

The optical signal on the optical transmission path is supplied to the optical branch unit 230 where average optical strength is divided into two. The branched optical signals are supplied to the OR/OS pair 210 for the active system and the OR/OS pair 211 for the standby system, respectively. As described above, the OR/OS pairs 210 and 211 each converts the optical signal into an electric signal by means of an optical-to electric conversion. Subsequently, the OR/OS pair converts the electric signal into an optical signal by means of an electric-to optical conversion. The OR/OS pairs 210 and 211 also perform waveform reshape and waveform regeneration of the converted optical signal and produce the reshaped and regenerated optical signal. The reshaped and regenerated optical signals are supplied from each of the OR/OS pairs 210 and 211 to the optical coupler 250 where they are multiplexed. The multiplexed optical signal is then branched into two and supplied to the gate switch device 200 and 201, respectively. The length of the optical path from the input port of the optical branch unit 230 to the optical coupler 250 via the OR/OS pair 210 is equal to the length of the optical path from the input port of the optical branch unit 230 to the optical coupler 250 via the OR/OS pair 211. Therefore, the two optical signals to be multiplexed by the optical coupler 250 are in synchronism in time with each other.

The optical signals supplied from the output port of the optical coupler 250 are supplied to the gate switch devices 200 and 201, respectively. The gate switch devices 200 and 201 switch the optical paths, if necessary. The switching pattern for the gate switch device 200 is exactly identical to that for the gate switch device 201. The optical signals from the OR/OS pairs 220 and 221 are multiplexed by the optical coupler 260. The length of the optical path from the input port of the gate switch device 200 and the output port of the optical coupler 260 is equal to the length of the optical path from the input port of the gate switch device 201 to the output port of the optical coupler 260. Therefore, the two optical signals to be multiplexed by the optical coupler 260 are in synchronism in time with each other.

The optical signals multiplexed by the optical coupler 260 are supplied to the OR/OS pairs 220 and 221. As in the OR/OS pairs 210 and 211, the optical signals are waveform reshaped and regenerated. The reshaped and regenerated signals are supplied from the OR/OS pairs 220 and 221 to the optical transmission path after being multiplexed by the optical multiplexer 240. The length of the optical path from the input port of the optical coupler 260 to the output port of the optical multiplexer 240 via the OR/OS pair 220 is equal to the length of the optical path from the input port of the optical coupler 260 to the output port of the optical multiplexer 240 via the OR/OS pair 221. Therefore, the optical signals to be multiplexed by the optical multiplexer 240 are supplied to the optical transmission path in a time synchronous manner.

Aiming at the operational status of the OR/OS pairs 210, 211, 220, and 221 as well as the gate switch devices 200 and 201. It is assumed that only the OR/OS pair 210 is disconnected while in operation. In this case, the OR/OS pairs 210 and 211 are connected to the gate switch devices 200 and 201, respectively, through the optical coupler 250. Therefore, the gate switch devices 200 and 201 are both capable of operating correctly. At that time, it is assumed that the OR/OS pair 221 is disconnected while in operation. At that time, the OR/OS pairs 211 and 220 and the gate switch devices 200 and 201 are operable correctly because the gate switch devices 200 and 201 are connected to the OR/OS pairs 220 and 221, respectively, through the optical coupler 260. Therefore, the optical signal is supplied to the optical transmission path via the optical transmission system of this invention without any deterioration of the quality. More specifically, it is enough that at least one of the OR/OS pairs 210 and 211, and at least one of the OR/OS pairs 220 and 221 are operated correctly because of the optical couplers 250 and 260 in the optical transmission system of the second embodiment. This means that reliability against a fault can be improved.

The gate switch devices 200 and 201 are operated with a 3-dB margin relative to the input optical strength of the incident light when both of them are operated normally. Likewise, the OR/OS pairs 220 and 221 ate operated with a 3-dB margin relative to the input optical strength of the incident light when both of the gate switch devices 200 and 201 are operated normally. For example, it is assumed that only the gate switch device 201 is operated with the gate switch device 200 disconnected while in operation. At that time, the input optical strength of the signals supplied to the gate switch device 201 and to the OR/OS pair 221 are higher by 3 dB when only the gate switch device 201 is operated and the gate switch device 200 is disconnected while in operation, than those obtained with the gate switch device 200 connected. However, the gate switch device 201 and the OR/OS pair 221 has a margin of at least 3 dB relative to the input optical strength of the incident light. For the two optical signals to be multiplexed by the optical multiplexer 240, any effect of interference between two wavelengths is negligible during the multiplexing operation. Accordingly, the optical signal can be transmitted on the optical transmission path without any degradation. Thus, the optical signal passes through the optical transmission system of this invention without any deterioration of the quality even when the gate switch device 200 is disconnected while the optical transmission system is in service. The above-mentioned description in conjunction with FIGS. 6A and 6B applies the case where the gate switch devices 200 and 201 are used entirely as a completely non blocking single optical switch device. Accordingly, the combination of the gate switch devices 200 and 201 are operable as a single completely non blocking gate switch device.

Figure 8:
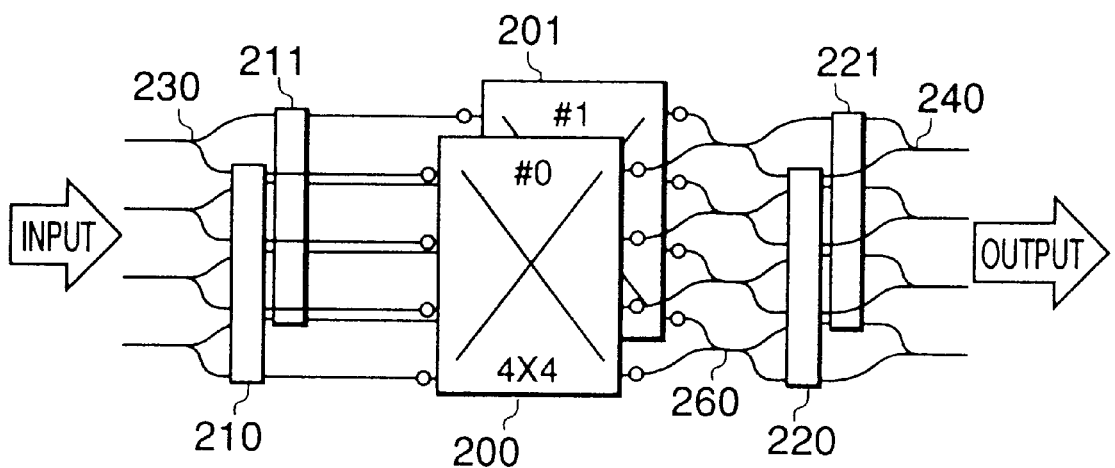
FIG. 8 is a view showing a practical configuration of the optical transmission system in FIG. 4.

Referring to FIG. 8, an example of the optical transmission system of the third embodiment is described that is equal to the one described in conjunction with FIG. 4. In FIG. 8, the optical transmission system is similar to the one illustrated in FIG. 5 except for an optical coupler 260. More specifically, the optical coupler 260 is connected between the gate switch device 200 and the OR/OS pair 220 and between the gate switch device 201 and the OR/OS pair 221.

The optical signal on the optical transmission path is supplied to the optical branch unit 230 where average optical strength is divided into two. The branched optical signals are supplied to the OR/OS pair 210 for the active system and the OR/OS pair 211 for the standby system, respectively. As described above, the OR/OS pairs 210 and 211 each converts the optical signal into an electric signal by means of an optical-to-electric conversion. Subsequently, the OR/OS pair converts the electric signal into an optical signal by means of an electric-to-optical conversion. The OR/OS pairs 210 and 211 also perform waveform reshape and waveform regeneration of the converted optical signal and produce the reshaped and regenerated optical signal. The reshaped and regenerated optical signals are supplied from each of the OR/OS pairs 210 and 211 to the gate switch devices 200 and 201, respectively. The gate switch devices 200 and 201 switch the optical paths, if necessary. The switching pattern for the gate switch device 200 is exactly identical to that for the gate switch device 201. The optical signals from the OR/OS pairs 220 and 221 are multiplexed by the optical coupler 260. The length of the optical path from the input port of the gate switch device 200 and the output port of the optical coupler 260 is equal to the length of the optical path from the input port of the gate switch device 201 to the output port of the optical coupler 260. Therefore, the two optical signals to be multiplexed by the optical coupler 260 are in synchronism in time with each other.

The optical signals multiplexed by the optical coupler 260 are supplied to the OR/OS pairs 220 and 221. As in the OR/OS pairs 210 and 211, the optical signals are waveform reshaped and regenerated. The reshaped and regenerated signals are supplied from the OR/OS pairs 220 and 221 to the optical transmission path after being multiplexed by the optical multiplexer 240. The length of the optical path from the input port of the optical coupler 260 to the output port of the optical multiplexer 240 via the OR/OS pair 220 is equal to the length of the optical path from the input port of the optical coupler 260 to the output port of the optical multiplexer 240 via the OR/OS pair 221. Therefore, the optical signals to be multiplexed by the optical multiplexer 240 are supplied to the optical transmission path in a time synchronous manner.

The optical signal may be wavelength converted at the OR/OS pairs 210, 211, 120, and 221, if necessary. Accordingly, the optical signals at the 1.5 μm band and at the 1.3 μm band may be transmitted from the OR/OS pairs 210 and 211, respectively. The OR/OS pairs 210, 211, 220, and 221 no carry out pulse synchronization, so that they can deal with optical signals received at any transmission rate. More specifically, optical signals may be supplied to the gate switch devices 200 and 201 simultaneously at the transmission rate of 10 Giga bit/s and 2.5 Giga bit/s, respectively, for the subsequent switching of the paths, and they may be supplied to the optical transmission path again.

Aiming at the operational status of the OR/OS pairs 210, 211, 220, and 221 as well as the gate switch devices 200 and 201. If the OR/OS pair 221 is disconnected while in operation, the OR/OS pairs 211 and 220 as well as the gate switch devices 200 and 201 operable correctly because the gate switch devices 200 and 201 are connected to the OR/OS pairs 220 and 221, respectively, through the optical coupler 260. Therefore, the optical signal is supplied to the optical transmission path via the optical transmission system without any deterioration of the quality. More specifically, it is enough that at least one of the OR/OS pairs 210 and 211, and at least one of the OR/OS pairs 220 and 221 are operated correctly because of the optical coupler 260 in the optical transmission system of the third embodiment. This means that reliability against a fault can be improved.

The gate switch devices 200 and 201 are operated with a 3-dB margin relative to the input optical strength of the incident light when both of them are operated normally.

Likewise, the OR/OS pairs 220 and 221 are operated with a 3-dB margin relative to the input optical strength of the incident light when both of the gate switch devices 200 and 201 are operated normally. For example, it is assumed that only the gate switch device 201 is operated with the gate switch device 200 disconnected while in operation. At that time, the input optical strength of the signals supplied to the gate switch device 201 and to the OR/OS pair 221 are higher by 3 dB when only the gate switch device 201 is operated and the gate switch device 200 is disconnected while in operation, than those obtained with the gate switch device 200 connected. However, the gate switch device 201 and the OR/OS pair 221 has a margin of at least 3 dB relative to the input optical strength of the incident light. Thus, the optical signal passes through the optical transmission system of this invention without any deterioration of the quality even when the gate switch device 200 is disconnected while the optical transmission system is in service.

The above-mentioned description in conjunction with FIG. 6 applies the case where the gate switch devices 200 and 201 are used entirely as a completely non blocking single optical switch device. Accordingly, the combination of the gate switch devices 200 and 201 are operable as a single completely non blocking gate switch device.

Next, a modification of the first through third embodiment of the present invention is described. A clock retiming function may be provided to the OR/OS pairs 110, 111, 120, and 121 described in conjunction with FIGS. 1, 3, and 4, along with the waveform reshaping and regenerating functions. In this event, the maximum and minimum amount of the transmission rate acceptable for the optical signals are limited by the maximum and minimum transmission rate available at the OR/OS pairs 110, 111, 120, and 121. There is no limitation to the method how to achieve the optical switch device. It may be a mechanical type optical switch device or a thin organic film type optical switch device. There is no limitation to the branching ratio of the optical couplers 150 and 160 each having two input ports and two output ports for connecting the OR/OS pair(s) with the optical switch device(s). For example, the ratio may be 1:1 or 1:2. In addition, there is no limitation to the branching ratio of the optical branch unit 130 having one input port and two output ports and the optical multiplexer 140 having two input ports and one output port, for connecting the OR/OS pair(s) with the optical switch device(s). For example, the ratio may be 1:1 or 1:2. There is no limitation to an oscillation wavelength at the optical transmitter of the OR/OS pairs. The wavelength may be a 1.55 μm band, a 1.51 m band, or a 1.3 μm band. These may be combined together. The time synchronization technique for the active and the standby systems is not limited specifically. For example, the active and the standby systems may be synchronized in time with each other by means of inserting a variable or fixed optical delay adjuster between the output port of the optical switch device and the optical receiver of the OR/OS pair.

The optical transmission system of the present invention has the following advantages.

A first advantage is the uninterrupted switching between the active and the standby systems. This can be achieved because of the 3-dB margin relative to the input optical strength of the incident light for the OR/OS pair connected to the optical switch device from the input optical strength of the incident light obtained when both optical switch devices for the active and the standby systems are operated normally. This allows live insertion of the optical signal without any deterioration of the quality thereof.

A second advantage is that there is no limitation to the transmission rate of the optical signal to be transmitted. This is because no time synchronization is required at the OR/OS pairs in the optical transmission system according to the present invention.

A third advantage is that the optical transmission system has the wavelength conversion function. This is achieved by because the OR/OS pairs connected to the input and the output sides of the optical switch device(S) are capable of converting the optical input signal into an electric signal and then converting the electric signal again to an optical signal having a different wavelength from the optical input signal.

A fourth advantage is that the optical transmission system of the present invention has the waveform reshaping and regenerating functions. This is because the waveform reshaping and regenerating operations can be made during the optical-to-electric and electric-to-optical conversions.

A fifth advantage of the present invention is that the optical transmission system of the present invention can be operated in a completely non blocking manner. The completely non blocking operation can be achieved by using the active and the standby systems as a single optical switch device even when each of them are not completely non blocking types.

A sixth advantage is that the optical transmission system of the present invention can deal with any wavelengths for the optical input and the output signals thereinto and therefrom. This is achieved because the OR/OS pairs can receive/transmit optical signals having any wavelengths by means of adjusting the receiving wavelength of the optical receiver and the oscillation wavelength of the optical transmitter in the OR/OS pairs.

A seventh advantage lies in that interference between optical wavelengths can be avoided between the active and the standby systems in the optical transmission system of the present invention. Any effect of interference between two wavelengths is negligible during the multiplexing operation, with the wavelengths of the optical signals passing through the optical transmission system being set at a 1.5 $\mu$m band and a 1.3 $\mu$m band by means of adjusting the receiving wavelength of the optical receiver and the oscillation wavelength of the optical transmitter in the OR/OS pairs.

What is claimed is:

1. An optical transmission system comprising an optical branch unit for branching an N number of optical input signals to produce an N number of branched optical signals for an active system and an N number of branched optical signals for a standby system; a first OR/OS pair including a first optical receiver and a first optical transmitter, said first optical receiver being adapted to perform, in response to reception of said branched optical signals for said active system, optical-to-electric conversion of the optical signals to produce electric signals, and said first optical transmitter being adapted to perform electric-to-optical conversion of said electric signals supplied from said first optical receiver to produce optical signals; a second OR/OS pair including a second optical receiver and a second optical transmitter, said second optical receiver being adapted to perform, in response to reception of said branched optical signals for said standby system, optical-to-electric conversion of the optical signals to produce electric signals, and said second optical transmitter being adapted to perform electric-to-optical conversion of the electric signals supplied from said second optical receiver to produce optical signals; an optical switch device for said active system connected to said first OR/OS pair and having an N number of input ports and an M number of output ports; an optical switch device for said standby system connected to said second OR/OS pair and having an N number of input ports and an M number of output ports; a third OR/OS pair including a third optical receiver and a third optical transmitter, said third optical receiver being connected to the M number of output ports of said optical switch device for said active system and adapted to perform optical-to-electric conversion of the optical signals to produce electric signals, and said third optical transmitter being adapted to perform electric-to-optical conversion of the electric signals supplied from said third optical receiver to produce optical signals; a fourth OR/OS pair including a fourth optical receiver and a fourth optical transmitter, said fourth optical receiver being connected to the M number of output ports of said optical switch device for said standby system and adapted to perform optical-to-electric conversion of the optical signals to produce electric signals, and said fourth optical transmitter being adapted to perform electric-to-optical conversion of the electric signals supplied from said fourth optical receiver to produce optical signals; and an optical multiplexer for multiplexing an M number of optical signals supplied from said third OR/OS pair and an M number of optical signals supplied from said fourth OR/OS pair to produce an M number of output optical signals, said optical switch devices for said active and said standby systems and said first through said fourth OR/OS pairs being each capable of operating with a received optical signal having input optical strength that is lower than the acceptable maximum input optical strength and is higher than the acceptable minimum input optical strength when both of said optical switch devices for said active and said standby systems are in operation, a first path and a second path being each adjusted such that the time required for transmitting an optical signal is identical for all paths, said first path being from an output port of said optical branch unit to the point where the optical signals are multiplexed in said optical multiplexer via said first OR/OS pair, said optical switch device for said active system, and said third OR/OS pair, said second path being from an output port of said optical branch unit to the point where the optical signals are multiplexed in said optical multiplexer via said second OR/OS pair, said optical switch device for said standby system, and said fourth OR/OS pair, the optical signals supplied from said third OR/OS pair and the optical signals supplied from said fourth OR/OS pair being within a range where interference between them is negligible.

2. An optical transmission system as claimed in claim 1, wherein said optical switch devices for said active and said standby systems each having one or more ports connected to each other that is/are other than the N number of input ports and the M number of output ports, the optical signals passing through inside said optical switch devices for said active and said standby systems being exchangeable with each other.

3. An optical transmission system as claimed in claim 2, wherein said optical receivers of said third and said fourth OR/OS pairs are each capable of operating with a received optical signal having input optical strength that is lower than the acceptable maximum input optical strength and is higher than the acceptable minimum input optical strength when both of said optical switch devices for said active and said standby systems are in operation.

4. An optical transmission system as claimed in claim 3, wherein said optical transmitters of said third and said fourth OR/OS pairs are for disconnecting output of the optical signals when said input optical strength of the incident light to said optical receiver at said first and said second OR/OS pairs become equal to or lower than a predetermined threshold value.

5. An optical transmission system comprising an optical branch unit for branching an N number of optical input signals to produce an N number of branched optical signals for an active system and an N number of branched optical signals for a standby system; a first OR/OS pair including a first optical receiver and a first optical transmitter, said first optical receiver being adapted to perform, in response to reception of said branched optical signals for said active system, optical-to-electric conversion of the optical signals to produce electric signals, and said first optical transmitter being adapted to perform electric-to-optical conversion of the electric signals supplied from said first optical receiver to produce an N number of optical signals; a second OR/OS pair including a second optical receiver and a second optical transmitter, said second optical receiver being adapted to perform, in response to reception of said branched optical signals for said standby system, optical-to-electric conversion of the optical signals to produce electric signals, and said second optical transmitter being adapted to perform electric-to-optical conversion of the electric signals supplied from said second optical receiver to produce an N number of optical signals; a first optical coupler connected to said first OR/OS pair and said second OR/OS pair, said first optical coupler being for multiplexing said N number of optical signals from said first OR/OS pair with said N number of optical signals from said second OR/OS pair and then branching them to produce the N number of optical signals for said active sytem and the N number of optical signals for said standby system; an optical switch device for said active system connected to said first optical coupler and having an N number of input ports and an M number of output ports; an optical switch device for said standby system connected to said first optical coupler and having an N number of input ports and an M number of output ports; a second optical coupler connected to the M number of output ports of said optical switch device for said active system and to the M number of output ports of said optical switch device for said standby system, said second optical coupler being for multiplexing an M number of optical signals from said optical switch device for said active system and an M number of optical signals from said optical switch device for said standby system and then branching them to produce an M number of multiplexed optical signals for said active system and an M number of multiplexed optical signals for said standby system; a third OR/OS pair including a third optical receiver and a third optical transmitter, said third optical receiver being connected to said second optical coupler and adapted to perform optical-to-electric conversion of the optical signals to produce electric signals, and said third optical transmitter being adapted to perform electric-to-optical conversion of the electric signals supplied from said third optical receiver to produce optical signals; a fourth OR/OS pair including a fourth optical receiver and a fourth optical transmitter, said fourth optical receiver being connected to said second optical coupler and adapted to perform optical-to-electric conversion of the optical signals to produce electric signals, and said fourth optical transmitter being adapted to perform electric-to-optical conversion of the electric signals supplied from said fourth optical receiver to produce optical signals; and an optical multiplexer for multiplexing an M number of optical signals supplied from said third OR/OS pair and an M number of optical signals supplied from said fourth OR/OS pair to produce an M number of output optical signals, said optical switch devices for said active and said standby systems and said first through said fourth OR/OS pairs being each capable of operating with a received optical signal having input optical strength that is lower than the acceptable maximum input optical strength and is higher than the acceptable minimum input optical strength when both of said optical switch devices for said active and said standby systems are in operation, a first path and a second path being each adjusted such that the time required for transmitting an optical signal is identical for all paths, said first path being from an output port of said optical branch unit to the point where the optical signals are multiplexed in said first optical coupler via said first OR/OS pair, said second path being from an output port of said optical branch unit to the point where the optical signals are multiplexed in said first optical coupler via said second OR/OS pair, a third path and a fourth path being each adjusted such that the time required for transmitting an optical signal is identical for all paths, said third path being from the point where the optical signals are branched in said first optical coupler to the point where the optical signals are multiplexed in said second optical coupler via said optical switch device for said active system, said fourth path being from the point where the optical signals are branched in said first optical coupler to the point where the optical signals are multiplexed in said second optical coupler via said optical switch device for said standby system, a fifth path and a sixth path being each adjusted such that the time required for transmitting an optical signal is identical for all paths, said fifth path being from the point where the optical signals are branched in said second optical coupler to the point where the optical signals are multiplexed in said optical multiplexer via said third OR/OS pair, said sixth path being from the point where the optical signals are branched in said second optical coupler to the point where the optical signals are multiplexed in said optical multiplexer via said fourth OR/OS pairs, the optical signals supplied from said third OR/OS pair and the optical signals supplied from said fourth OR/OS pair being within a range where interference between them is negligible.

6. An optical transmission system as claimed in claim 5, wherein said optical switch devices for said active and said standby systems each having one or more ports connected to each other that is/are other than the N number of input ports and the M number of output ports, the optical signals passing through inside said optical switch devices for said active and said standby systems being exchangeable with each other.

7. An optical transmission system as claimed in claim 6, wherein the optical receivers of said third and said fourth OR/OS pairs are each capable of operating with a received optical signal having input optical strength that is lower than the acceptable maximum input optical strength and is higher than the acceptable minimum input optical strength when both of said optical switch devices for said active and said standby systems are in operation.

8. An optical transmission system as claimed in claim 7, wherein the optical transmitters of said third and said fourth OR/OS pairs are for disconnecting output of the optical signals when the input optical strength of the incident light to said optical receiver at said first and said second OR/OS pairs become equal to or lower than a predetermined threshold value.

9. An optical transmission system comprising an optical branch unit for branching an N number of optical input signals to produce an N number of branched optical signals for an active system and an N number of branched optical signals for a standby system; a first OR/OS pair including a first optical receiver and a first optical transmitter, said first optical receiver being adapted to perform, in response to reception of the branched optical signals for said active system, optical-to-electric conversion of the optical signals to produce electric signals, and said first optical transmitter being adapted to perform electric-to-optical conversion of the electric signals supplied from said first optical receiver to produce optical signals; a second OR/OS pair including a second optical receiver and a second optical transmitter, said second optical receiver being adapted to perform, in response to reception of the branched optical signals for said standby system, optical-to-electric conversion of the optical signals to produce electric signals, and said second optical transmitter being adapted to perform electric-to-optical conversion of the electric signals supplied from said second optical receiver to produce optical signals; an optical switch device for said active system connected to said first OR/OS pair and having an N number of input ports and an M number of output ports; an optical switch device for said standby system connected to said second OR/OS pair and having an N number of input ports and an M number of output ports; an optical coupler connected to the M number of output ports of said optical switch device for said active system and the M number of output ports of said optical switch device for said standby system, said optical coupler being for multiplexing an M number of optical signals from said optical switch device for said active system with an M number of optical signals from said optical switch device for said standby system and then branching them to produce an M number of optical signals for said active system and an M number of optical signals for said standby system; a third OR/OS pair including a third optical receiver and a third optical transmitter, said third optical receiver being connected to said optical coupler and adapted to perform optical-to-electric conversion of the optical signals to produce electric signals, and said third optical transmitter being adapted to perform electric-to-optical conversion of the electric signals supplied from said third optical receiver to produce optical signals; a fourth OR/OS pair including a fourth optical receiver and a fourth optical transmitter, said fourth optical receiver being connected to said optical coupler and adapted to perform optical-to-electric conversion of the optical signals to produce electric signals, and said fourth optical transmitter being adapted to perform electric-to-optical conversion of the electric signals supplied from said fourth optical receiver to produce optical signals; and an optical multiplexer for multiplexing the M number of optical signals supplied from said third OR/OS pair and the M number of optical signals supplied from said fourth OR/OS pair to produce an M number of output optical signals, said optical switch devices for said active and said standby systems and said first through said fourth OR/OS pairs being each capable of operating with a received optical signal having input optical strength that is lower than the acceptable maximum input optical strength and is higher than the acceptable minimum input optical strength when both of said optical switch devices for said active and said standby systems are in operation, a first path and a second path being each adjusted such that the time required for transmitting an optical signal is identical for all paths, said first path being from an input port of said optical branch unit to the point where the optical signals are multiplexed in said optical coupler via said first OR/OS pair and said optical switch device for said active system, said second path being from an input port of said optical branch unit to the point where the optical signals are multiplexed in said optical coupler via said second OR/OS pair and said optical switch device for said standby system, a third path and a fourth path being each adjusted such that the time required for transmitting an optical signal is identical for all paths, said third path being from the point where the optical signals are branched in said optical coupler to the point where the optical signals are multiplexed in said optical multiplexer via said third OR/OS pair, said fourth path being from the point where the optical signal are branched in said optical coupler to the point where the optical signals are multiplexed in said optical multiplexer via said fourth OR/OS pair, the optical signals supplied from said third OR/OS pair and the optical signals supplied from said fourth OR/OS pair being within a range where interference between them is negligible.

10. An optical transmission system as claimed in claim 9, wherein said optical switch devices for said active and said standby systems each having one or more ports connected to each other that is/are other than the N number of input ports and the M number of output ports, the optical signals passing through inside said optical switch devices for said active and said standby systems being exchangeable with each other.

11. An optical transmission system as claimed in claim 10, wherein said optical receivers of said third and said fourth OR/OS pairs are each capable of operating with a received optical signal having input optical strength that is lower than the acceptable maximum input optical strength and is higher than the acceptable minimum input optical strength when both of said optical switch devices for said active and said standby systems are in operation.

12. An optical transmission system as claimed in claim 11, wherein said optical transmitters of said third and said fourth OR/OS pairs are for disconnecting output of the optical signals when the input optical strength of the incident light to said optical receiver at said first and said second OR/OS pairs become equal to or lower than a predetermined threshold value.

* * * * *